UNITED STATES PATENT OFFICE.

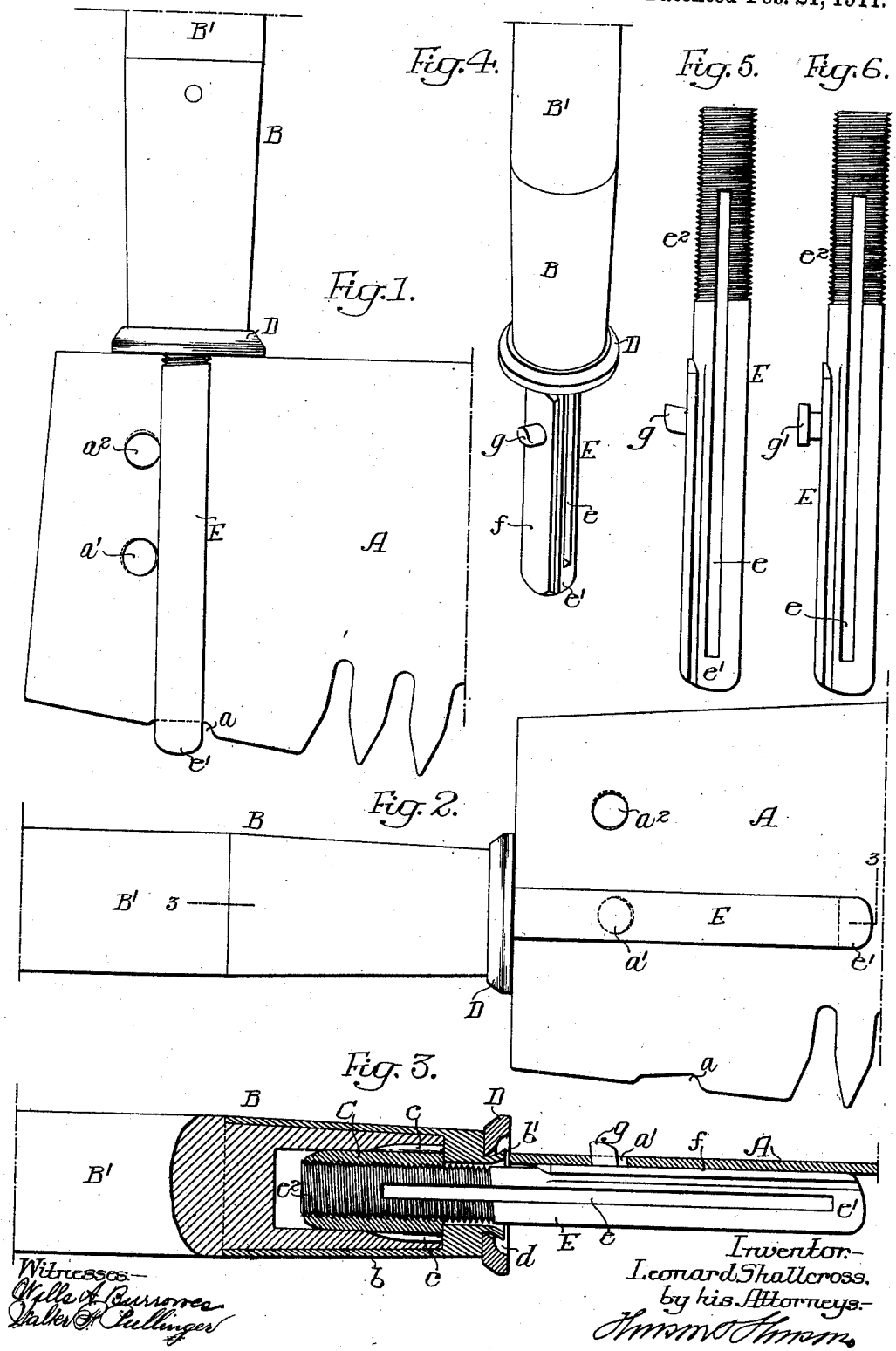

LEONARD SHALLCROSS, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

CROSSCUT-SAW HANDLE.

984,975.  Specification of Letters Patent.  Patented Feb. 21, 1911.

Application filed March 9, 1909.  Serial No. 482,336.

*To all whom it may concern:*

Be it known that I, LEONARD SHALLCROSS, a citizen of the United States, residing in Philadelphia, Pennsylvania, have invented certain Improvements in Crosscut-Saw Handles, of which the following is a specification.

The object of my invention is to so construct a cross cut saw handle that it can be applied to the blade with the body portion of the handle either at right angles to the blade or on a line with the blade, so that when the saw is being carried through the woods the handle can be so adjusted that it will not be caught by the underbrush; and furthermore the handle can be adjusted so that the saw can be used in places where a handle arranged at right angles to the blade would interfere.

In the accompanying drawing:—Figure 1, is a side view of one end of a saw blade showing my improved handle in position at right angles to the blade; Fig. 2, is a view showing the handle arranged on the longitudinal line of the blade; Fig. 3, is a sectional view on the line 3—3, Fig. 2; Fig. 4, is a detached perspective view of the handle; Fig. 5, is a detached view of the clamp loop; and Fig. 6, is a view of a modification.

A is a saw blade having a notch $a$ and two holes $a'$, $a^2$ in the present instance.

B is the handle having a wooden grip section B' and the ferrule $b$ retaining the nut C within the wooden portion of the handle. This nut has wings $c$, $c$ which enter the wood of the handle and prevent the nut from turning. The ferrule has a flange $b'$ which passes through an opening in a bearing ring D; the flange after the ring is in place being flared so as to retain the ring to the ferrule. The ring has a recess $d$ into which the flange $b'$ extends.

E is a clamp loop made U-shaped in the present instance, as shown in Fig. 5, having a slot $e$ ending in an abutment $e'$. This abutment is slightly rounded and enters the notch $a$ in the saw blade when the handle is in the position illustrated in Fig. 1. The inner end of this loop section E is threaded as at $e^2$ and is adapted to the threads of the nut C, as indicated in Fig. 3. The side $f$ of the loop section E is flattened, and projecting from this side is a pin $g$ preferably arranged at a slight incline, as illustrated in Fig. 3.

When the handle is applied to the saw, as in Fig. 1, the saw blade A extends through the slot $e$ in the loop and the portion $e'$ enters the notch $a$ in the blade. Then, on screwing down the handle, the ring D will bear upon the upper edge of the blade and will draw the loop tightly onto the blade, thus firmly attaching the handle to the blade. This is the normal position of the handle when the saw is used, but in sawing thick timber, where there is a considerable underbrush, it is difficult to carry the saw from one place to another with the handle in the position shown in Fig. 1, and it is rather difficult to carry the saw without the handle. Consequently I so construct the handle that it can be applied to the saw as indicated in Fig. 2, the handle being arranged on the longitudinal line of the saw so that it will not engage the underbrush. When in this position, the projection $g$ enters one of the holes $a'$ or $a^2$ in the blade A and the handle is turned so as to draw the parts together; the blade being clamped between the ring D and the pin $g$. Upon inclining the pin a trifle it has a tendency to draw the blade onto the flat portion $f$ of the clamp loop E. In some cases it may be desirable to saw with the handle in this position, and this fastening is sufficient to retain the handle in position when sawing.

A cross cut saw handle of this type is readily and cheaply manufactured and can be applied to any of the standard cross cut saws now in use, as each is generally provided with one or more holes at the end as well as the notch at the lower edge.

While I have shown an inclined pin, as at $g$, Fig. 5, the pin may be a straight pin having a head, as illustrated at $g'$ in Fig. 6.

I claim:—

1. A detachable handle for saws comprising a slotted bar threaded at one end and having one outer face flat, a pin projecting at an incline from the outer flat surface of the bar to engage an aperture in a saw blade, a handle, a nut within the handle and adapted to engage the threaded portion of the said bar, and a ring loosely secured adjacent the end of the handle to engage an edge of the saw blade.

2. A detachable handle for saws comprising a slotted bar threaded at one end, said bar having a longitudinally extending outer flat face, a pin projecting at a straight incline from the said bar to engage an aperture in a saw blade, a handle, a nut within the handle and adapted to engage the threaded portion of the bar, and a ring secured adjacent the end of the handle to engage an edge of the saw blade, the parts being so arranged that a saw blade clamped between the pin and ring will be wedged against the flat outer face with a positive surface contact.

In testimony whereof, I have signed my name to this specification, in the presence of two subscribing witnesses.

LEONARD SHALLCROSS.

Witnesses:
 WILLIAM SMITH,
 E. B. ROBERTS.